United States Patent
Wagner et al.

(10) Patent No.: US 9,939,020 B2
(45) Date of Patent: Apr. 10, 2018

(54) BEARING RING INCLUDING RETAINING FLANGE

(71) Applicants: Gerhard Wagner, Prichsenstadt (DE); Martina Sticht, Sennfeld (DE)

(72) Inventors: Gerhard Wagner, Prichsenstadt (DE); Martina Sticht, Sennfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/187,857

(22) Filed: Jun. 21, 2016

(65) Prior Publication Data
US 2017/0146063 A1    May 25, 2017

(30) Foreign Application Priority Data
Jun. 16, 2015 (DE) .................... 10 2015 211 062

(51) Int. Cl.
*F16C 33/58* (2006.01)
*F16C 33/60* (2006.01)
*F16C 19/36* (2006.01)

(52) U.S. Cl.
CPC .......... *F16C 33/585* (2013.01); *F16C 19/364* (2013.01); *F16C 33/605* (2013.01)

(58) Field of Classification Search
CPC .... F16C 19/364; F16C 19/383; F16C 19/385; F16C 19/386; F16C 33/583; F16C 33/585; F16C 33/586; F16C 33/605
See application file for complete search history.

(56) References Cited

U.S. PATENT DOCUMENTS

| | | | |
|---|---|---|---|
| 2,071,628 A | 2/1937 | Hedgcock | |
| 8,267,593 B2 * | 9/2012 | Suma | B60B 27/00 384/589 |
| 2007/0041678 A1 * | 2/2007 | Matsuyama | F16C 19/225 384/571 |

FOREIGN PATENT DOCUMENTS

| | | | |
|---|---|---|---|
| DE | 6900506 U | | 5/1969 |
| DE | 102011086925 A1 | | 5/2013 |
| DE | 102014222278 | * | 5/2016 |
| JP | 2014001800 A | | 1/2014 |
| TW | 201532273 A | | 8/2015 |
| WO | 2006/94661 A1 | | 9/2006 |

* cited by examiner

*Primary Examiner* — James Pilkington
(74) *Attorney, Agent, or Firm* — Bryan Peckjian; SKF USA Inc. Patent Dept.

(57) ABSTRACT

A bearing ring of a rolling-element bearing includes a raceway for rolling elements and at least one flange for guiding the rolling elements, the flange merging into a bearing ring shoulder and extending to a height above the raceway. A free space such as a recess is formed between the bearing ring shoulder and the flange such that the flange is freestanding over its entire height.

16 Claims, 2 Drawing Sheets

BEARING RING INCLUDING RETAINING FLANGE

CROSS-REFERENCE

This application claims priority to German patent application no. 10 2015 211 062.1 filed on Jun. 16, 2015, the contents of which are fully incorporated herein by reference.

TECHNOLOGICAL FIELD

The present disclosure is directed to a bearing ring including a rolling-element bearing with a raceway for rolling elements and at least one flange for supporting rolling elements, as well as to a rolling-element bearing including such a bearing ring.

BACKGROUND

Bearing inner rings and bearing outer rings of a rolling-element bearing generally each include a raceway along which rolling elements are configured to roll. The bearing rings can include axially disposed flanges, so-called retaining and/or guide flanges. The retaining flange plays a role in supporting the rolling elements during bearing installation and/or during transport, and the guide flange serves for axially guiding rolling elements, in particular during bearing operation. The retaining flanges and/or guide flanges are disposed axially adjacent to the raceway of the bearing ring and delimit the axial extension of the raceway. In a cylindrical roller bearing the rolling elements are configured as cylindrical rolling elements, and in a tapered roller bearing the rolling elements are configured as truncated-cone-shaped or conical rolling elements. The retaining flange and/or guide flanges serve in these cases for axially supporting the rolling elements, which are supported at their axial end sides on the respective facing flange. In the following discussion, the disclosure relates to bearing rings that are formed one-part with respect to their entire circumference.

It is known to induction harden the raceways of bearing rings in order to make them sufficiently hard and strong so as to adequately withstand mechanical stresses, such as, for example, deformations due to tension or pressure. The induction hardening as a method for setting certain surface layer conditions is based on a structural transformation that results from material-specific thermal treatments. The process can generally be divided into heating a region to a temperature above the austenitizing temperature and, optionally, a subsequently quenching the material to a temperature below the temperature at which martensite starts to form. This produces an austenitic structure in an outer layer of a bearing ring, at a raceway region, for example, while inward of the raceway the initial microstructure remains. Induction hardening is used increasingly often because it allows only part of a surface to be hardened and provides good control of hardness values and hardness curves.

Disadvantageously, during the induction hardening process a thermal expansion of the material occurs that is particularly critical in the region of the bearing retaining flange. This is because, as a rule, the retaining flange and/or the bearing-ring shoulder adjacent to the retaining flange are not hardened and are therefore not heated. Particularly large stresses thus may occur in this region which can lead to undesirable crack formation. Crack formation is particularly problematic in bearing rings of tapered roller bearings because they have a highly varying cross-section over their width with respect to the material thickness, and thus the induction hardening process produces an amount of heat in the rings that varies greatly. The greater the angle that the raceway forms with respect to the rotational axis, the more the material thickness increases over the width of the ring.

SUMMARY

An aspect of the present disclosure is therefore to provide a bearing ring with raceways that can be induction hardened without damaging regions adjacent to the raceways and to provide a rolling-element bearing including such a bearing ring.

Another aspect of the disclosure comprises a bearing ring of a rolling-element bearing that includes a raceway for rolling elements and at least one flange that merges into a bearing ring shoulder. The flange rises to a height H over or above the raceway, which flange is preferably a retaining flange. Since the retaining flange only serves for installation purposes and/or for securing rolling elements during transport, it is generally preferred that the flange remain unhardened. Although preferred for the retaining flange, all of the features discussed below can also equally be used in a guide flange. The rolling-element bearing is preferably a tapered roller bearing, wherein the raceway forms an angle of between 10 degrees and 60 degrees with the rotational axis of the bearing, and the bearing ring shoulder is substantially cylindrical and extends around the rotational axis. Thus an angle of between 100 degrees and 150 degrees is formed between the bearing ring shoulder and the raceway. Most preferably the rolling-element bearing is a double row tapered roller bearing in a back-to-back arrangement, and the bearing ring of the disclosure is configured as an inner ring.

In order to prevent crack formation during induction hardening due to thermal stresses created by the induction hardening process, particularly in the region of the not-induction-treated flange, a free space or recess is provided between the bearing ring shoulder and the flange, which free space or recess is configured such that the flange is free-standing over its entire height H. Due to the disclosed configuration of a recess and freestanding flange, the free-standing flange can thermally expand during induction hardening, whereby crack formation is counteracted. Here the free space is preferably configured as a recess whose depth T is chosen such that the flange is freestanding over its entire height H. As used herein, a flange is defined as a "freestanding flange" that has a height on its flange side disposed opposite the raceway that is at least as great as the height on the side of the flange facing the raceway. The heights are each measured perpendicular to the raceway, or on the side facing away from the raceway, which side is perpendicular to an imaginary extension of the raceway.

The recess for realizing the freestanding flange can in principle be represented in two ways. On the one hand it can be represented by an encircling groove between the bearing ring shoulder and the flange. In this way it is possible to set the radius R1 of the cylindrical outer circumferential surface of the bearing ring shoulder independent of the radius of the raceway. The radius R1 of the bearing ring shoulder can be equal to or even greater than the radius of the raceway at its smallest diameter with respect to the rotational axis. On the other hand the recess for realizing the freestanding flange can also be obtained in that the radius of the cylindrical outer circumferential surface of the bearing ring shoulder R1 is chosen such that it is substantially smaller than or equal in size to the radius R2 of a base point of the freestanding flange on the side opposite the raceway. Thus the recess extends over the entire width of the bearing ring shoulder. In this way a freestanding flange is achieved without an additional groove being disposed between the bearing ring shoulder and the flange. An encircling flange adjacent to the raceway is defined as a "freestanding flange" if it has a height on the side facing away from the raceway that is at least as great as the height H of the flange on the side facing the raceway. Here the height is respectively measured perpendicular to the raceway, or an imaginary extension of the raceway up to the highest point of the flange with respect to the cylindrical or conical surface of the raceway. Here the width of the flange, measured parallel to the raceway, can be essentially constant but can also decrease with increasing height.

When the recess is configured as a groove it is not only formed as an undercut but preferably extends significantly into a region below the raceway and the bearing ring shoulder so that the bearing ring shoulder has a first radial distance to a rotational axis of the bearing ring, and the recess has a deepest point that has a second radial distance to the rotational axis of the bearing ring, and where a difference between the first radial distance and the second radial distance is greater than the height H of the flange. In an embodiment of the bearing ring for use as a bearing inner ring, the second radial distance is smaller than the first radial distance, while in an embodiment of the bearing ring for use as a bearing outer ring the second radial distance is greater than the first radial distance. Furthermore it is advantageous if the depth T, measured perpendicular to the raceway from a deepest point of the recess up to the maximum height H of the flange, is greater than one-and-one-half times the height H, preferably greater than twice the height H. Alternatively a particularly advantageous design of the groove provides that the deepest point of the groove with respect to the raceway lies deeper than the surface-layer-hardening depth of the raceway. The surface-layer-hardening depth is defined here such that the hardness at this depth under the raceway surface still has 80% of the hardness of the raceway surface. In this way a particularly good thermal expansion of the flange is made possible.

According to a further preferred exemplary embodiment the recess extends essentially perpendicular to the raceway of the bearing ring. In this way the thermal stresses generated in the induction hardening process can be particularly effectively reduced since the recess allows for a thermal expansion of the flange towards the bearing ring shoulder.

In a further advantageous exemplary embodiment the recess includes a first and a second recess wall that are essentially parallel to each other. The recess can thus be incorporated in the bearing ring in a simple way, for example, by turning. In general, however, the first and the second recess wall can also be configured such that they are not parallel to each other, but form, for example, a cone-shaped recess.

According to a further advantageous exemplary embodiment the recess is configured as an encircling groove. In this way the recess can be incorporated in the bearing ring in a simple manner.

Alternatively or additionally, as already mentioned above, in addition to the retaining flange a guide flange can also be provided on the bearing ring. Instead of or in addition to the retaining flange, the guide flange can also be formed as a freestanding flange as described above. In this way inductors can be used that only harden the raceway of the bearing ring.

A particularly advantageous exemplary embodiment provides that the bearing ring is configured as the inner ring of a tapered roller bearing, that the flange is a retaining flange, and that the bearing ring shoulder and the raceway form an angle of between 100 degrees and 150 degrees. It is particularly advantageous if the raceway forms an angle of between 130 degrees and 140 degrees with the bearing ring shoulder. As already explained above, the freestanding retaining flange provides greater benefits as the material distribution over the cross-section of the bearing ring becomes more asymmetric.

According to another exemplary embodiment the bearing ring includes a further flange, which is configured as a guide flange for tapered rollers, and the bearing ring is configured such that the raceway and the guide flange of the bearing ring each include an induction hardened surface. In this way it is ensured that only the regions of the bearing ring that are in direct contact with the rolling elements during operation of the rolling-element bearing have an induction hardened surface. The bearing ring shoulder is preferably not induction hardened. For processing reasons the retaining flange can optionally also be induction hardened.

A further aspect relates to a tapered roller bearing including at least two bearing rings wherein the bearing rings are configured as inner rings and abut each other by the end sides of their bearing ring shoulders. In this way a double row bearing assembly in back-to-back arrangement can particularly advantageously be provided, wherein the spacing of the two rolling-element rows can be determined over the width of the bearing ring shoulders.

Further advantages and advantageous embodiments are specified in the description and the drawings. Here a combination of the features in the description and in the drawings is purely exemplary, and it is clear to the person skilled in the art that the features need not necessarily be present in the specified combinations, but can also be present individually or combined in other ways, without exceeding the scope of the disclosure.

In the following the principle of the disclosure is described in more detail using the exemplary embodiments depicted in the drawings. The exemplary embodiments here are purely exemplary in nature and are not intended to define the scope of the invention. This applies in particular for features depicted in combination that can also be realized as standalone features in the context of the present disclosure. The scope of the application is defined solely by the appended claims.

DETAILED DESCRIPTION

In the following, identical or functionally equivalent elements are designated by the same reference numbers.

Figure 1:
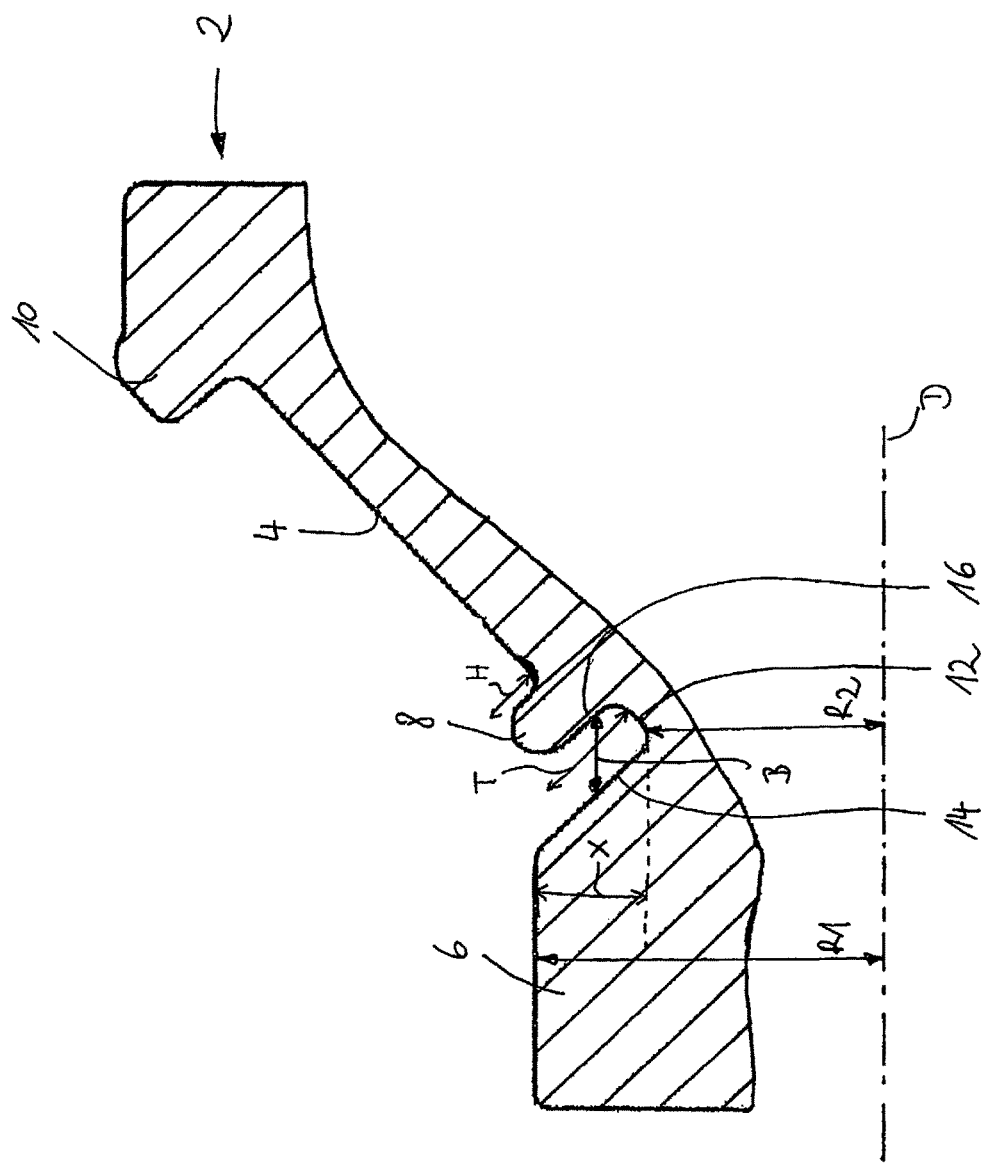
FIG. 1 shows a schematic cross-sectional view through a bearing ring according to a first disclosed embodiment.

FIG. 1 shows a schematic cross-sectional view through a bearing ring 2, which includes a raceway 4 on which rolling elements (not shown) can be disposed. The bearing ring 2 further includes a retaining flange 8 merging into a bearing ring shoulder 6 and a guide flange 10. The retaining flange 8 projects to a height H above the raceway 4 of the bearing ring 2, the height H being measured from the surface of the raceway 4 to the highest point on the retaining flange relative to the raceway 4. In this embodiment, the bearing ring shoulder 6 and the retaining flange 8 may be surface regions of the bearing ring 2 that should not be hardened, while the raceway 4 and the guide flange 10 are preferably induction hardened.

As FIG. 1 further shows, the retaining flange 8 is freestanding and includes a free space between the bearing shoulder 6 and the retaining flange 8, which is preferably configured as a recess 12 formed by an encircling groove having a depth T and a width B. The depth T of the recess 12 is measured perpendicular to the raceway 4 from the maximum height H down to the deepest point of the recess 12, and, as can be seen in FIG. 1, is dimensioned such that it clearly extends in a region below the raceway 4 and the bearing ring shoulder 6. It is particularly preferred if the depth T is chosen such that it is approximately twice as large as the height H. Due to the resulting freestanding design the retaining flange 8 can thermally expand during an induction hardening process so that stresses in this region can be reduced and crack formation can be avoided. It is thus possible to induction harden the raceway 4 and/or the guide flange 10 and to use the advantages associated with the induction method without damaging the retaining flange 8.

Furthermore, FIG. 1 shows that the bearing shoulder 6 is located a first radial distance R1 from a rotational axis D of the bearing ring 2 and that the recess 12 is located a second radial distance R2 from a rotational axis D of the bearing ring 2, and a difference X between the first radial distance R1 and the second radial distance R2 is greater than the height H of the retaining flange 8. This produces a particularly extensive free space or clearance around or adjacent to the retaining flange, and thus accommodates even relatively large amounts of thermal expansion.

FIG. 1 further shows that the recess 12 extends substantially perpendicular to the raceway 4 of the bearing ring 2. In this way the stresses generated in the induction hardening process can also be particularly effectively reduced.

As further depicted in FIG. 1, the recess 12 includes a first and a second recess wall 14,16, which are substantially parallel to each other. This allows the recess to be incorporated in the bearing ring 2 in a simple manner, for example, by turning. In general, however, it is also possible to configure the recess walls 14, 16 differently, for example, such that they are tapered, and thus produce a recess having a conical shape.

Alternatively or additionally, instead of providing the recess 12 adjacent to the retaining flange 8, another recess (not illustrated) may be provided adjacent to the guide flange 10. This may be useful, for example, in cases where hardening the guide flange 10 is not desired.

Overall due to the formation of a recess between a bearing ring shoulder and a flange, in particular a retaining flange, a bearing ring for a rolling-element bearing can be provided that includes a freestanding flange relative to the bearing ring shoulder. Thus a thermal expansion of the flange is accommodated during an induction hardening process so that tensions, and crack formations resulting therefrom, can be reduced in this region.

Figure 2:
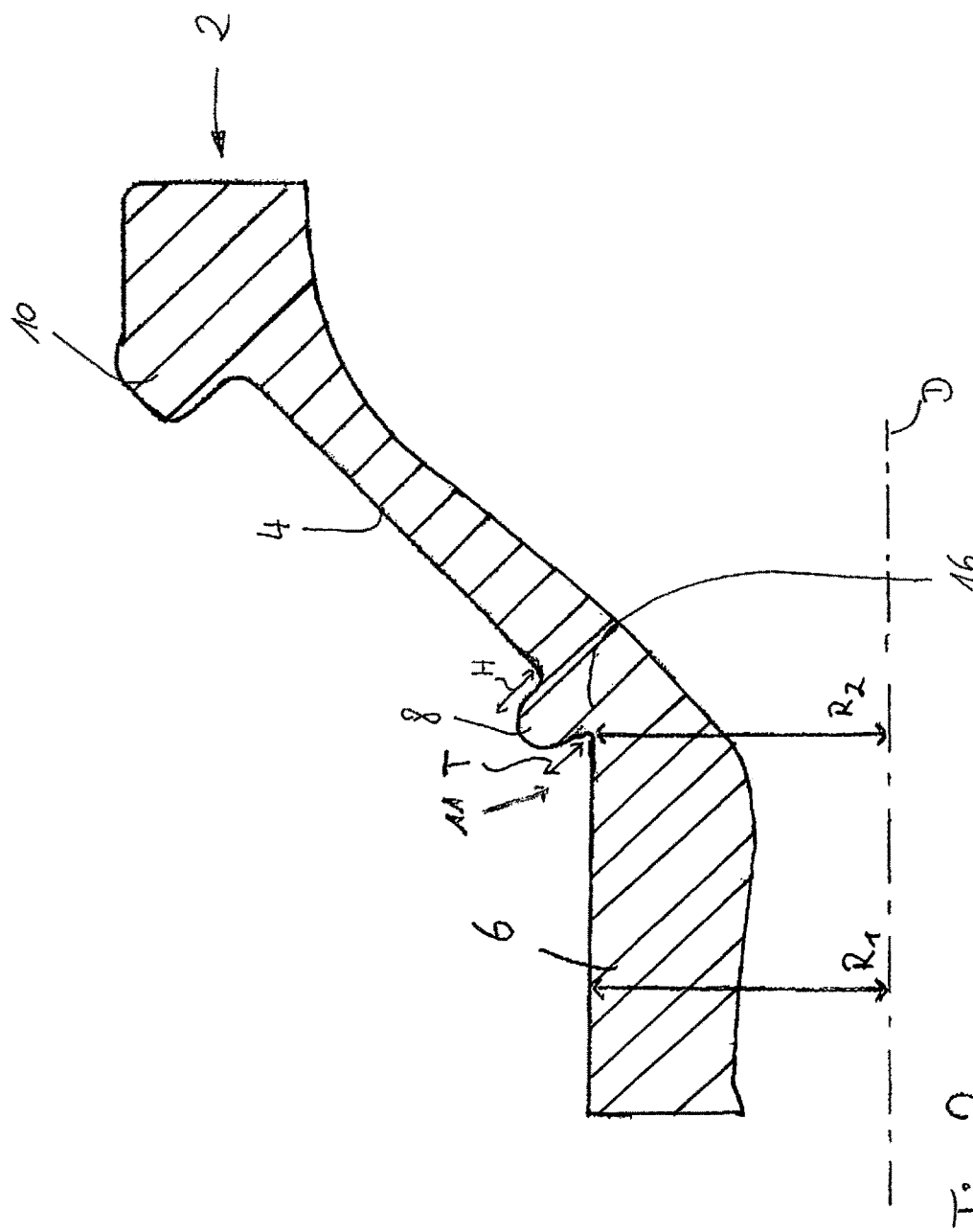
FIG. 2 shows a schematic cross-sectional view through a bearing ring according to a second disclosed embodiment.

In FIG. 2 a schematic cross-sectional view is depicted through a further bearing ring 2 according to the present disclosure. Here identical parts of the bearing rings of FIGS. 1 and 2 are indicated by identical reference numbers. The bearing ring of FIG. 2 includes a free space or clearance between bearing shoulder 6 and retaining flange 8, in the form of a recess 11 extending over the entire width of the bearing ring shoulder. The depth T of the recess 11 is chosen in FIG. 2 such that it is approximately the same size as the height H of the retaining flange 8. In other words, the distance from the top of the retaining flange 8 to the raceway 4 is approximately the same as the distance from the top of the retaining flange 8 to the bearing ring shoulder 6. Due to the freestanding design thus resulting the retaining flange 8 can thermally expand during an induction hardening process so that stresses in the region of the flange 8 can be reduced and crack formation can be reduced or avoided. Thus it is possible to induction harden the raceway 4 and/or the guide flange 10, and to use the advantages associated with the induction process.

In FIG. 2 the bearing ring shoulder 6 has a first radial distance R1 to a rotational axis D of the bearing ring 2, and the recess 11 has a second radial distance R2 to a rotational axis D of the bearing ring 2, wherein in contrast to FIG. 1 the two distances R1 and R2 are equal so that an additional groove between the bearing ring shoulder 6 and the retaining flange 8 can be omitted. Alternatively or additionally recesses can be provided on one or both sides at the foot of the retaining flange 8, using which recesses the transitions from the raceway to the retaining flange 8 and/or from the bearing ring shoulder 6 to the retaining flange 8 can be formed in a low-stress manner. In this case the distances R1 and R2 would differ from each other by the depth of the recess, but only insignificantly with respect to the height H.

Whereas in FIG. 1 the cylindrically configured bearing ring shoulder 6 has a radius R1 that is essentially equal in size to the smallest radius of the raceway 4, the radius R1 of the bearing ring shoulder 6 of the bearing ring in FIG. 2 is smaller than the smallest radius of the raceway 4.

In both FIGS. 1 and 2, however, due to the free space 11 and/or recess 12 the retaining flange 8 is formed as a freestanding retaining flange over its entire height H. According to the disclosure the bearing ring shoulders 6 are not hardened, whereas the surfaces of the raceway 4 and of the guide flange 10 are induction hardened. Due to the induction hardening process of the raceway 4 the region of the transition from the raceway 4 to the retaining flange 8 it can be expedient to also induction harden the retaining flange 8 at least in sections in order to uniformly form the surface hardness of the raceway 4 over the entire region. Thus a transition from the induction hardened surface to the not-induction-hardened surface can be provided on the side of the retaining flange 8 facing away from the raceway 4.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

2 Bearing ring
4 Raceway
6 Bearing ring shoulder
8 Retaining flange
10 Guide flange
11 Recess
12 Recess
14, 16 Recess wall
T Depth of the recess
H Height of the retaining flange
D Rotational axis
R1, R2 Radial distance
X Difference between the radial distances
B Distance between bearing ring shoulder and flange

What is claimed is:

1. A bearing ring of a rolling-element bearing comprising:
a raceway for rolling elements; and
at least one flange for supporting the rolling elements, the flange merging into a bearing ring shoulder and extending to a height above the raceway,
wherein a free space is formed between the bearing ring shoulder and the flange, the free space being dimensioned such that the flange is freestanding over its entire height,
wherein the bearing ring is an inner ring of a tapered roller bearing, wherein the flange is a retaining flange, and wherein the bearing ring shoulder and the raceway form an angle of between 100 degrees and 150 degrees;
and wherein the bearing ring includes a guide flange for tapered rollers, and wherein the raceway and the guide flange each include an induction hardened surface, and wherein the bearing ring shoulder does not include an induction hardened surface.

2. The bearing ring according to claim 1, wherein the free space comprises a recess having a depth measured perpendicular to the raceway.

3. The bearing ring according to claim 2, wherein the raceway is on a conical surface, wherein the flange projects in a first direction from the conical surface and wherein the recess extends in a second direction from the conical surface.

4. The bearing ring according to claim 2, wherein the depth measured from a deepest point of the recess up to a maximum height of the flange is greater than one-and-one-half times the height of the flange.

5. The bearing ring according to claim 2, wherein the depth measured from a deepest point of the recess up to a maximum height of the flange is greater than two times the height of the flange.

6. The bearing ring according to claim 2, wherein the recess extends substantially perpendicular to the raceway of the bearing ring.

7. The bearing ring according to claim 2, wherein the recess includes a first recess wall and a second recess wall substantially parallel to the first recess wall.

8. The bearing ring according to claim 2 wherein the recess comprises an encircling groove.

9. The bearing ring according to claim 2, wherein the depth is greater than a surface-layer hardening depth of the raceway.

10. The bearing ring according to claim 1,
wherein the free space comprises a recess having a depth measured perpendicular to the raceway, the recess extending substantially perpendicular to the raceway of the bearing ring,
wherein the raceway is on a conical surface, wherein the flange projects in a first direction from the conical surface and wherein the recess extends in a second direction from the conical surface,
wherein the depth measured from a deepest point of the recess up to a maximum height of the flange is greater than two times the height of the flange relative to the raceway,
wherein the recess includes a first recess wall and a second recess wall substantially parallel to the first recess wall, and
wherein the recess comprises an encircling groove.

11. A bearing ring of a tapered rolling-element bearing comprising:
a raceway having a radially inner side and a radially outer side, the radially outer side being axially spaced from the radially inner side;
a bearing ring shoulder radially inward of the radially outer side of the raceway and axially spaced from the radially inner side of the raceway;
a flange at the radially inner side of the raceway configured to support rolling elements on the raceway; and
a recess between the flange and the bearing ring shoulder,
wherein the flange has a first side facing the raceway, the first side having a first length and a second side facing the recess, the second side having a second length greater than the first length, the second side forming a wall of the recess, wherein the first side is substantially parallel to the second side.

12. The bearing ring according to claim 11, wherein the second length is at least one and one half times greater than the first length.

13. The bearing ring according to claim 11, wherein the bearing ring shoulder and the raceway form an angle of between 100 degrees and 150 degrees.

14. The bearing ring according to claim 11, wherein the second length is greater than a surface-layer hardening depth of the raceway.

15. A bearing ring of a tapered rolling-element bearing comprising:
a raceway having a radially inner side and a radially outer side, the radially outer side being axially spaced from the radially inner side;
a bearing ring shoulder radially inward of the radially outer side of the raceway and axially spaced from the radially inner side of the raceway;
a flange at the radially inner side of the raceway configured to support rolling elements on the raceway; and
a recess between the flange and the bearing ring shoulder,
wherein the flange has a first side facing the raceway, the first side having a first length and a second side facing the recess, the second side having a second length greater than the first length, the second side forming a wall of the recess, wherein the wall of the recess is substantially perpendicular to the raceway.

16. The bearing ring according to claim 15, wherein the first side is substantially parallel to the second side.

* * * * *